US012196400B1

(12) United States Patent
Niu

(10) Patent No.: US 12,196,400 B1
(45) Date of Patent: Jan. 14, 2025

(54) OUTDOOR LIGHT WITH WIRE CRIMP PLATE

(71) Applicant: Fujuan Niu, Shenzhen (CN)

(72) Inventor: Fujuan Niu, Shenzhen (CN)

( * ) Notice: Subject to any disclaimer, the term of this patent is extended or adjusted under 35 U.S.C. 154(b) by 0 days.

(21) Appl. No.: 18/746,302

(22) Filed: Jun. 18, 2024

(51) Int. Cl.

| | |
|---|---|
| ***F21V 23/00*** | (2015.01) |
| ***F21V 5/04*** | (2006.01) |
| ***F21V 17/00*** | (2006.01) |
| ***F21V 17/16*** | (2006.01) |
| ***F21V 31/00*** | (2006.01) |

(52) U.S. Cl.
CPC .............. *F21V 23/002* (2013.01); *F21V 5/04* (2013.01); *F21V 17/005* (2013.01); *F21V 17/16* (2013.01); *F21V 17/164* (2013.01); *F21V 23/005* (2013.01); *F21V 31/005* (2013.01)

(58) Field of Classification Search
CPC .... F21V 23/002; F21V 17/005; F21V 17/164; F21V 5/04; F21V 23/005; F21V 31/005; F21V 17/16
See application file for complete search history.

(56) References Cited

U.S. PATENT DOCUMENTS 8,083,381 B2 * 12/2011 Tsai ...................... F21V 17/164
362/249.02
2013/0183779 A1 * 7/2013 Pachler ................. F21V 21/002
362/249.02
2017/0206813 A1 * 7/2017 Huang ...................... F21V 5/04

* cited by examiner

*Primary Examiner* — Tracie Y Green
*Assistant Examiner* — Michael Chiang

(57) ABSTRACT

An outdoor light including an outer housing and an inner housing, a circuit board, and a crimp plate; wherein a light-transmitting member is embedded on a top end of the outer housing; the outer housing and the inner housing enclose together to define a mounting space; the circuit board is disposed within the mounting space, separating the mounting space into a light-emitting space and a sealing space; a side of the circuit board, on which the light-emitting space is located, is arranged with a light-emitting unit; a side of the circuit board, on which the sealing space is located, is electrically connected to a wire; a snap structure is arranged in the sealing space, and the crimp plate is detachably fixed in the sealing space by the snap structure; the crimp plate and the circuit board clamp a portion of the wire.

14 Claims, 3 Drawing Sheets

OUTDOOR LIGHT WITH WIRE CRIMP PLATE

TECHNICAL FIELD

The present disclosure relates to the technical field of lamps and lanterns, and more specifically to an outdoor light.

BACKGROUND

With the continuous progress of science and technology, the current lamps and lanterns can change various colors, and its weather resistance has been strengthened. In addition to the lighting function, the lamps and lanterns is a kind of decorative objects, such as outdoor lights. A number of outdoor lights in series can be wrapped around or laid on an outdoor object to foil the environmental environment. A conventional outdoor light on the market mainly includes a shell, a light-emitting circuit board, and a wire, where the shell is enclosed by an upper cover and a lower cover. The upper cover is arranged with a light-transmitting cover on an end wall, and the light-emitting circuit board is arranged in the shell; an open end of the lower cover squeezes the light-emitting circuit board, such that the light-emitting circuit board is arranged abutting against the light-transmitting cover, and a light-emitting side of the light-emitting circuit board faces the light-transmitting cover. An end of the wire is connected to a side of the light-emitting circuit board back from the light-transmitting cover, and the other end of the wire is threaded through an outlet hole on a side wall of the shell to the outside world.

However, the end wall of the lower cover of this type of outdoor light is usually connected to an installation, and in order to make the wires closer to the installation such that the alignment is more aesthetically pleasing, the outlet hole on the shell is often arranged close to the end wall of the lower cover, which leads to a certain angle between a section of the wire located in the shell and the main board (light-emitting circuit board). When an exposed end of the wire is tugged, the connection between the wire and the main board is easy to be fractured by force, resulting in a break in the circuit, and affecting the normal use of the outdoor light.

SUMMARY OF THE DISCLOSURE

In view of this, the present disclosure provides an outdoor light for solving the problems in the related art that there is a certain angle between a section of the wire located in the shell and the main board, where the problems lead to that when an exposed end of the wire is tugged, the connection between the wire and the main board is easy to be fractured by force, resulting in a break in the circuit, and affecting the normal use of the outdoor light.

For one or some or all of the above purposes or otherwise, the present disclosure proposes an outdoor light, including an outer housing and an inner housing, a circuit board, and a crimp plate; wherein a light-transmitting member is embedded on a top end of the outer housing; the outer housing and the inner housing enclose together to define a mounting space; the circuit board is disposed within the mounting space, separating the mounting space into a light-emitting space and a sealing space, and the light-emitting space faces the light-transmitting member; a side of the circuit board, on which the light-emitting space is located, is arranged with a light-emitting unit; a side of the circuit board, on which the sealing space is located, is electrically connected to a wire; a snap structure is arranged in the sealing space, and the crimp plate is detachably fixed in the sealing space by the snap structure; the crimp plate and the circuit board clamp a portion of the wire.

In some embodiments, the snap structure includes a plurality of first snap posts vertically disposed on an inner side of the top end of the outer housing and distributed along a circumferential direction of the light-transmitting member, and the crimp plate defines a plurality of first snap holes in one-to-one correspondence with the plurality of first snap posts.

In some embodiments, the outer housing is a hollow structure with an opening toward the bottom end; the inner housing is in a shape of a plate and covers the opening at the bottom end of the outer housing, cooperating with an inner cavity of the outer housing in enclosing to define the mounting space; a side wall of the outer housing is arranged with a wire routing port, and the wire passes through the wire routing port to an outside.

In some embodiments, the snap structure further includes a plurality of guide blocks fixedly disposed on an inner side of the side wall of the outer housing and distributed along a circumferential direction of the side wall, and the crimp plate defines a plurality of fourth notches in one-to-one correspondence with the plurality of guide blocks; each fourth notch is slidably connected to a corresponding guide block.

In some embodiments, the top end of the outer housing is arranged with a light-transmitting port, and the light-transmitting member is movably socketed within the light-transmitting port; an end of the light-transmitting member disposed in the mounting space is arranged with a flap, the flap is disposed along an edge of the light-transmitting member, and the flap abuts against the inner side of the top end of the outer housing.

In some embodiments, the flap defines a plurality of first notches in one-to-one correspondence with the plurality of first snap posts, and each first snap post is slidably connected to a corresponding first notch.

In some embodiments, the flap defines a plurality of second notches in one-to-one correspondence with the plurality of guide blocks, and each guide block is slidably connected to a corresponding second notch.

In some embodiments, the circuit board defines a plurality of third notches in one-to-one correspondence with the plurality of guide blocks, and each guide block is slidingly connected to a corresponding third notch.

In some embodiments, the inner cavity of the outer housing defines a plurality of second snap holes opened toward the bottom end, the plurality of second snap holes are distributed along a circumferential direction of the side wall of the outer housing, and a plurality of second snap posts are arranged in one-to-one correspondence with the plurality of second snap holes on the inner housing; each second snap post is snapped with a corresponding second snap hole in condition of the inner housing covering the opening at the bottom end of the outer housing.

In some embodiments, a side of the crimp plate is arranged with two wire bundle blocks near an edge of the crimp plate, and the wire bundle blocks are spaced apart along the edge of the crimp plate; the wire is threaded out from between the two wire bundle blocks; each of the wire bundle blocks is configured to restrict a clamped end of the wire to avoid swinging.

In some embodiments, a middle portion of the crimp plate defines an adhesive filling port passing through both sides of the middle portion.

In some embodiments, the light-transmitting member is a convex lens; the convex lens is convex on an outward side, and the convex lens is concave on an inward side; the inward side of the convex lens and the circuit board enclose to define the light-emitting space.

In some embodiments, the bottom end of the outer housing is arranged with connection tabs symmetrically on both sides of the bottom end, and each connection tab defines a connecting hole.

Implementation of the embodiments of the present disclosure will have the following beneficial effects.

During an assembling process of the outdoor light, the circuit board is first placed in the outer housing, such that the circuit board is close to the light-transmitting member and encloses with the light-transmitting member each other to define the light-emitting space, then the crimp plate is placed in the enclosed space, and the crimp plate is fixed by using the snap structure to press the crimp plate such that the crimp plate is capped on the side of the circuit board on which the sealing space is located; the crimp plate cooperates with the circuit board to clamp the wire locally, thereby providing additional support for a connecting end of the wire, avoiding the connecting end from swinging drastically due to pulling by an external force, and preventing a connection between the connecting end and the circuit board from breaking easily, so as to ensure normal energization of the circuit board and to enhance the tensile performance of the wire.

BRIEF DESCRIPTION OF THE DRAWINGS

In order to more clearly illustrate the technical solutions in the embodiments or related art of the present disclosure, the accompanying drawings to be used in the description of the embodiments or related art will be briefly introduced below. It will be obvious that the accompanying drawings in the following description are only some of the embodiments of the present disclosure, and that for those skilled in the art, other drawings can be obtained on the basis of the accompanying drawings without creative labor.

Figure 1:
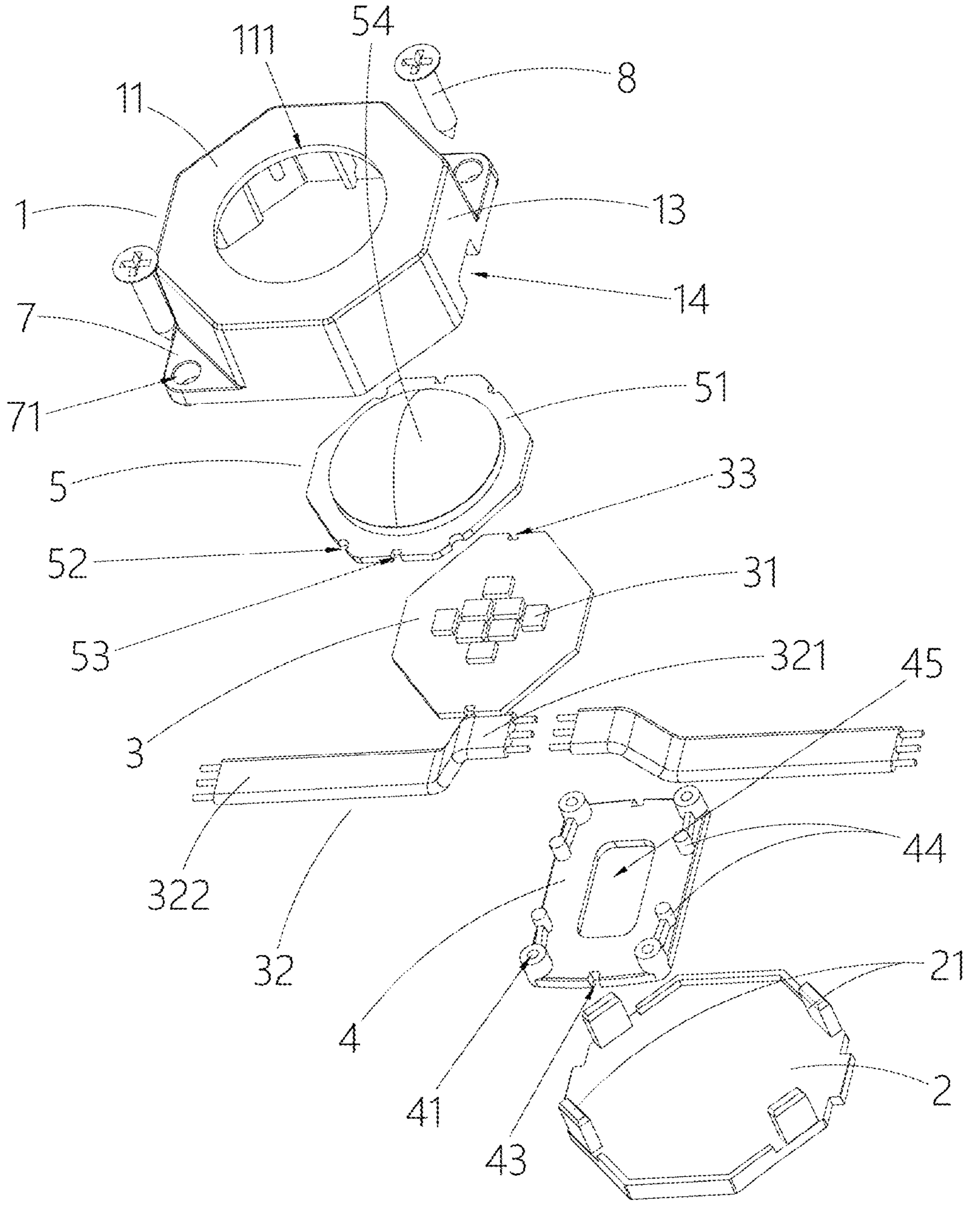
FIG. 1 is an exploded top view according to the present disclosure.

In the drawings: 1, outer housing; 11, top end; 111, light-transmitting port; 12, bottom end; 13, side wall; 14, wire routing port; 15, second snap hole; 2, inner housing; 21, second snap post; 3, circuit board; 31, light-emitting unit; 32, wire; 321, connecting end; 322, exposed end; 33, third notch; 4, crimp plate; 41, first snap hole; 43, fourth notch; 44, wire bundle block; 45, adhesive filling port; 5, light-transmitting member; 51, flap; 52, first notch; 53, second notch; 54, outward side of convex lens; 55, inward side of convex lens; 6, snap structure; 61, first snap post; 62, guide block; 7, connecting tab; 71, connecting hole; 8, screw; 9, mounting space; 91, light-emitting space; 92, sealing space.

DETAILED DESCRIPTION

Unless otherwise defined, all technical and scientific terms used herein have the same meaning as commonly understood by those skilled in the art of the present disclosure; the terms used herein in the specification of the present disclosure are intended only for the purpose of describing specific embodiments and are not intended to limit the present disclosure; the terms "including" and "having" and any variations thereof, as used in the specification and claims and foregoing drawing description of the present disclosure, are intended to cover non-exclusive inclusion. The terms "first", "second", etc. in the specification and claims and the accompanying drawings of the present disclosure are intended to distinguish between different objects and are not intended to describe a particular order.

Reference to "embodiments" herein implies that particular features, structures, or characteristics described in connection with the embodiments may be included in at least one embodiment of the present disclosure. The presence of the phrase at various points in the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

In order to provide those skilled in the art with a better understanding of the embodiments of the present disclosure, the technical solutions in the embodiments of the present disclosure will be clearly and completely described below in conjunction with the accompanying drawings.

Figure 2:
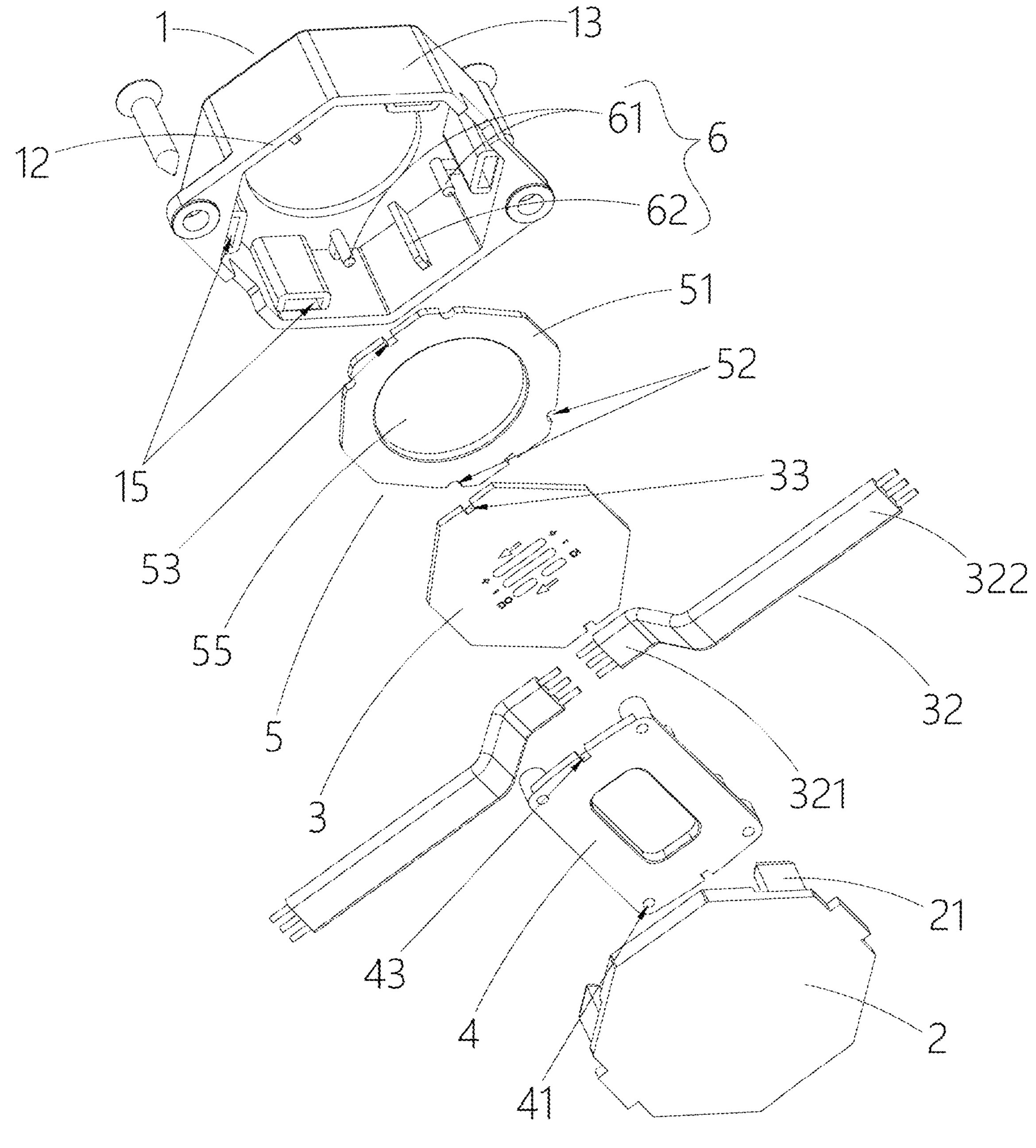
FIG. 2 is an exploded bottom view according to the present disclosure.
Figure 3:
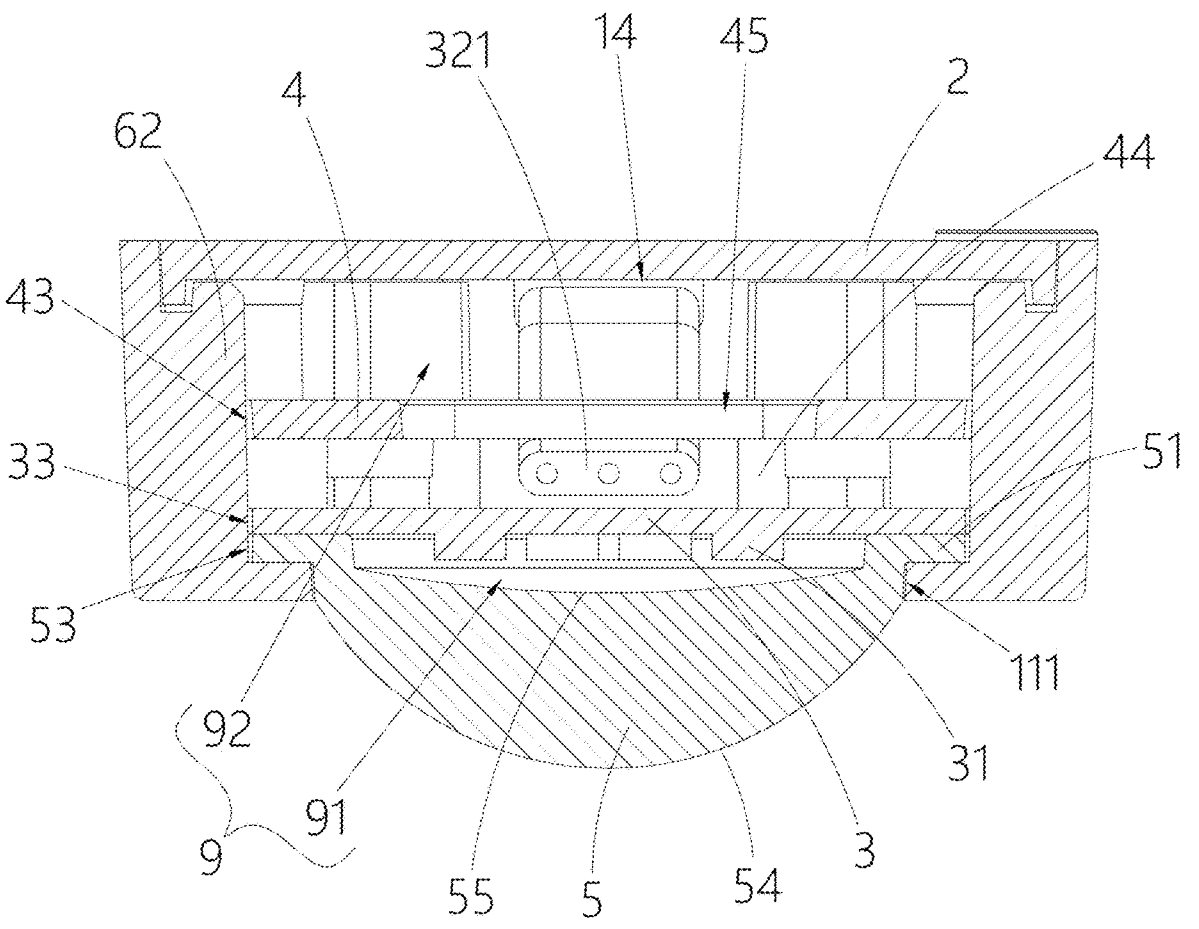
FIG. 3 is a cross-sectional schematic view according to the present disclosure.

As shown in FIGS. 1-3, an outdoor light includes an outer housing 1 and an inner housing 2, a circuit board 3, and a crimp plate 4; a light-transmitting member 5 is embedded on a top end 11 of the outer housing 1; the outer housing 1 and the inner housing 2 enclose together to define a mounting space 9; the circuit board 3 is disposed within the mounting space 9, separating the mounting space 9 into a light-emitting space 91 and a sealing space 92, where the light-emitting space 91 faces the light-transmitting member 5; a side of the circuit board 3, on which the light-emitting space 91 is located, is arranged with a light-emitting unit 31; a side of the circuit board 3, on which the sealing space 92 is located, is electrically connected to a wire 32; a snap structure 6 is arranged in the sealing space 92, and the crimp plate 4 is detachably fixed in the sealing space 92 by the snap structure 6; the crimp plate 4 and the circuit board 3 clamp the wire 32 locally.

In some embodiments, the snap structure 6 includes a buckle and a snap hook (not shown); the buckle is arranged on an inner wall of the sealing space 92, and the snap hook is fixedly arranged on each of both sides of the crimp plate 4; the snap hook can be matched with the buckle, such that the crimp plate 4 is fixedly capped on a side of the circuit board 3, for clamping the wire 32 locally.

In the embodiments, during an assembling process of the outdoor light, the circuit board 3 is first placed in the outer housing 1, such that the circuit board 3 is close to the light-transmitting member 5 and encloses with the light-transmitting member 5 each other to define the light-emitting space 91, then the crimp plate 4 is placed in the enclosed space, and the crimp plate 4 is fixed by using the snap structure 6 to press the crimp plate 4 such that the crimp plate 4 is capped on the side of the circuit board 3 on which the sealing space 92 is located; the crimp plate 4 cooperates with the circuit board 3 to clamp the wire 32 locally, thereby providing additional support for a connecting end 321 of the wire 32, avoiding the connecting end 321 from swinging drastically due to pulling by an external force, and preventing a connection between the connecting end 321 and the circuit board from breaking easily, so as to ensure normal energization of the circuit board and to enhance the tensile performance of the wire 32.

Further, the snap structure 6 includes multiple first snap posts 61 vertically disposed on an inner side of the top end 11 of the outer housing 1 and distributed along a circumferential direction of the light-transmitting member 5, and the crimp plate 4 defines multiple first snap holes 41 in one-to-one correspondence with the multiple first snap posts 61. In this way, when the crimp plate 4 is pressed against the side of the circuit board 3 on which the sealing space 92 is located and cooperates with the circuit board 3 in clamping the wire 32 locally, the first snap post 61 may snap with the corresponding first snap hole 41, thereby utilizing the interference fit between the two to limit the movement of the crimp plate 4, such that the crimp plate 4 is fixedly pressed against the connecting end 321 of the wire 32.

Further, the outer housing 1 is a hollow structure with an opening toward the bottom end 12; the inner housing 2 is in the shape of a plate and covers the opening at the bottom end 12 of the outer housing 1, cooperating with the inner cavity of the outer housing 1 in enclosing to define the mounting space 9, such that when the user mounts the circuit board 3 and the crimp plate 4 in turn, the sealant can be injected into the sealing space 92 through the opening of the outer housing 1 to seal the circuit board 3 through the sealant and to isolate the sealing space 92, the light-emitting space 91, and the outside world, thereby preventing rainwater from eroding the circuit board 3 or flowing into the light-emitting space 91, and prolonging the service life of the circuit board 3. For the conventional outdoor light, the circuit board 3 is required to be squeezed through a bottom cover to fix the circuit board 3, which generally injects the sealant into the sealing space 92 through an injection hole on the bottom cover; while the present disclosure utilizes the crimp plate 4 to fix the circuit board 3, thereby realizing an open-manner injection method, which may increase the contact area of the sealant with the air, which is conducive to accelerating the hardening speed of the sealant and improving the production efficiency. When the sealant is hardened, the mounting can be completed by simply covering the bottom cover; a side wall 13 of the outer housing 1 is arranged with a wire routing port 14, and the exposed end 322 of the wire 32 passes through the wire routing port 14 to the outside world; the exposed end 322 of the wire 32 can be connected to circuit boards of other outdoor lights, so as to allow multiple outdoor lights to be used in series.

Further, the snap structure 6 further includes multiple guide blocks 62 fixedly disposed on an inner side of the side wall 13 of the outer housing 1 and distributed along a circumferential direction of the side wall 13, the crimp plate 4 defines multiple fourth notches 43 in one-to-one correspondence with the multiple guide blocks 62. During a mounting process of the crimp plate 4, an inner wall of each fourth notch 43 can be slidably connected to a corresponding guide block 62, and the crimp plate 4 can be slid along the guide blocks 62 close to the circuit board 3 until the first snap posts 61 are snapped into the corresponding first snap holes 41, so as to assist the first snap holes 41 in aligning the first snap posts 61 by the guiding blocks 62, thereby reducing the difficulty of connecting the two.

Further, the top end 11 of the outer housing 1 is arranged with a light-transmitting port, and the light-transmitting member 5 is movably socketed within the light-transmitting port; an end of the light-transmitting member 5 disposed in the mounting space 9 is arranged with a flap 51, the flap 51 is disposed along an edge of the light-transmitting member 5, and the flap 51 abuts against the inner side of the top end 11 of the outer housing 1.

Specifically, during a mounting process, the light-transmitting member 5 is first extended into the mounting space 9 through the opening of the outer housing 1, and the light-transmitting member 5 is socketed in the light-transmitting port, such that the flap 51 abuts against the inner side of the top end 11 of the outer housing 1; then the circuit board 3 and the crimp plate 4 are mounted in sequence, and the circuit board 3 and the flap 51 are pressed against the inner wall of the top end 11 of the outer housing 1 using the crimp plate 4, in which case the flap 51 may be attached to the inner side of the top end 11 of the outer housing 1 to fix the flap 51 and the inner side of the top end 11 of the outer housing 1 by gluing; further, adhesive may be applied to seal a seam between the flap 51 and the inner side of the top end 11 of the outer housing 1 to enhance the airtightness and waterproof capability of the light-emitting space 91.

Further, the flap 51 defines multiple first notches 52 in one-to-one correspondence with the multiple first snap posts 61, and each first snap post 61 may be slidably connected to a corresponding first notch 52 to assist in positioning the flap 51, thereby enhancing the mounting accuracy of the light-transmitting member 5.

Further, the flap 51 defines multiple second notches 53 in one-to-one correspondence with the multiple guide blocks 62, and each guide block 62 may be slidably connected to a corresponding second notch 53 to further assist in positioning and mounting the flap 51 through the sliding connection between the two.

Further, the circuit board 3 defines multiple third notches 33 in one-to-one correspondence with the multiple guide blocks 62, and each guide block 62 may be slidingly connected to a corresponding third notch 33 to assist in positioning the circuit board 3, thereby enhancing the mounting accuracy of the circuit board 3, and ensuring that the circuit board 3 and the light-transmitting member 5 are aligned to enclose the light-emitting space 91.

Further, the inner cavity of the outer housing 1 defines multiple second snap holes 15 opened toward the bottom end 12, the multiple second snap holes 15 are distributed along the circumferential direction of the side wall 13 of the outer housing 1, and multiple second snap posts 21 are arranged in one-to-one correspondence with the second snap holes 15 on the inner housing 2; each second snap post 21 is snapped with a corresponding second snap hole 15 when the inner housing 2 covers the opening of the bottom end 12 of the outer housing 1 to securely enclose the inner housing 2 with the outer housing 1.

Further, a side of the crimp plate 4 is arranged with two wire bundle blocks 44 near an edge of the crimp plate 4, and the wire bundle blocks 44 are spaced apart along the edge of the crimp plate 4. In this way, when the crimp plate 4 and the circuit board 3 clamp the wire 32 locally, the wire 32 may be threaded out from between the two wire bundle blocks 44, in which case the wire bundle blocks 44 may restrict the connecting end 321 of the wire 32 to avoid swinging along a surface where the circuit board is located, so as to make the connecting end 321 of the wire 32 more stable, thereby preventing the connection between the wire 32 and the circuit board from breaking easily.

In the embodiments, two wires 32 are symmetrically connected to both ends of the circuit board on the same side, and the crimp plate 4 can simultaneously clamp the connecting ends 321 of the two wires 32; the wire bundle blocks 44 and the wire routing ports 14 are disposed corresponding to the wires 32, and each of the two wires 32 is threaded over the corresponding wire bundle block 44 and the wire routing port 14 to the outside world, such that multiple outdoor lights can be connected in series through the wires 32.

Further, a middle portion of the crimp plate 4 defines an adhesive filling port 45 through both sides of the middle portion, such that when the crimp plate 4 and the circuit board 3 clamp the wire 32 locally, the sealant filled into the sealing space 92 may flow to a connection between the circuit board and the wire 32 through the adhesive filling port 45, thereby enhancing the efficiency of the sealant sealing the circuit board and increasing the contact area between the sealant and the air.

Further, the light-transmitting member 5 is a convex lens, the convex lens is convex on an outward side 54, and the convex lens is concave on an inward side 55; the inward side 55 of the convex lens and the circuit board 3 enclose to define the light-emitting space 91; when the circuit board 3 is energized, the circuit board 3 drives the light-emitting unit 31 to emit light, and the light will be dispersed via the convex lens to improve the irradiation range of the outdoor light, thereby enhancing the decorative effect.

Further, the bottom end 12 of the outer housing 1 is arranged with connection tabs 7 symmetrically on both sides of the bottom end 12, and each connection tab 7 defines a connecting hole 71 for the user to screw a screw 8 through the connection hole 71 to an installation, so as to mount the outdoor light on the installation through the connection tabs 7 and the screws 8, thereby enhancing the mounting stability of the outdoor light.

Obviously, the above-described embodiments are only part of the embodiments of the present disclosure, not all of the embodiments. The embodiments of the present disclosure are given in conjunction with the accompanying drawings, but they do not limit the scope of the present disclosure. The present disclosure may be realized in many different forms, and, conversely, these embodiments are provided for the purpose of making the understanding the present disclosure more thorough and comprehensive. Although the present disclosure has been described in detail with reference to the foregoing embodiments, it is still possible for those skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the present disclosure.

What is claimed is:

1. An outdoor light, comprising:
- an outer housing,
- an inner housing,
- a circuit board, and
- a crimp plate; wherein a light-transmitting member is embedded on a top end of the outer housing; the outer housing and the inner housing enclose together to define a mounting space; the circuit board is disposed within the mounting space, separating the mounting space into a light-emitting space and a sealing space, and the light-emitting space faces the light-transmitting member; a side of the circuit board, on which the light-emitting space is located, is arranged with a light-emitting unit; a side of the circuit board, on which the sealing space is located, is electrically connected to a wire; a snap structure is arranged in the sealing space, and the crimp plate is detachably fixed in the sealing space by the snap structure; the crimp plate and the circuit board clamp a portion of the wire;
- wherein the snap structure comprises a plurality of first snap posts vertically disposed on an inner side of the top end of the outer housing and distributed along a circumferential direction of the light-transmitting member, and the crimp plate defines a plurality of first snap holes in one-to-one correspondence with the plurality of first snap posts.

2. The outdoor light according to claim 1, wherein the outer housing is a hollow structure with an opening toward the bottom end; the inner housing is in a shape of a plate and covers the opening at the bottom end of the outer housing, cooperating with an inner cavity of the outer housing in enclosing to define the mounting space; a side wall of the outer housing is arranged with a wire routing port, and the wire passes through the wire routing port to an outside.

3. The outdoor light according to claim 2, wherein the snap structure further comprises a plurality of guide blocks fixedly disposed on an inner side of the side wall of the outer housing and distributed along a circumferential direction of the side wall, and the crimp plate defines a plurality of fourth notches in one-to-one correspondence with the plurality of guide blocks; each fourth notch is slidably connected to a corresponding guide block.

4. The outdoor light according to claim 3, wherein the top end of the outer housing is arranged with a light-transmitting port, and the light-transmitting member is movably socketed within the light-transmitting port; an end of the light-transmitting member disposed in the mounting space is arranged with a flap, the flap is disposed along an edge of the light-transmitting member, and the flap abuts against the inner side of the top end of the outer housing.

5. The outdoor light according to claim 4, wherein the flap defines a plurality of first notches in one-to-one correspondence with the plurality of first snap posts, and each first snap post is slidably connected to a corresponding first notch.

6. The outdoor light according to claim 4, wherein the flap defines a plurality of second notches in one-to-one correspondence with the plurality of guide blocks, and each guide block is slidably connected to a corresponding second notch.

7. The outdoor light according to claim 3, wherein the circuit board defines a plurality of third notches in one-to-one correspondence with the plurality of guide blocks, and each guide block is slidingly connected to a corresponding third notch.

8. The outdoor light according to claim 2, wherein the inner cavity of the outer housing defines a plurality of second snap holes opened toward the bottom end, the plurality of second snap holes are distributed along a circumferential direction of the side wall of the outer housing, and a plurality of second snap posts are arranged in one-to-one correspondence with the plurality of second snap holes on the inner housing; each second snap post is snapped with a corresponding second snap hole in condition of the inner housing covering the opening at the bottom end of the outer housing.

9. The outdoor light according to claim 2, wherein the bottom end of the outer housing is arranged with connection tabs symmetrically on both sides of the bottom end, and each connection tab defines a connecting hole.

10. The outdoor light according to claim 1, wherein a side of the crimp plate is arranged with two wire bundle blocks near an edge of the crimp plate, and the wire bundle blocks are spaced apart along the edge of the crimp plate; the wire is threaded out from between the two wire bundle blocks; each of the wire bundle blocks is configured to restrict a clamped end of the wire to avoid swinging.

11. The outdoor light according to claim 1, wherein the light-transmitting member is a convex lens; the convex lens is convex on an outward side, and the convex lens is concave on an inward side; the inward side of the convex lens and the circuit board enclose to define the light-emitting space.

12. An outdoor light, comprising:

an outer housing, an inner housing, a circuit board, and a crimp plate; wherein a light-transmitting member is embedded on a top end of the outer housing; the outer housing and the inner housing enclose together to define a mounting space; the circuit board is disposed within the mounting space, separating the mounting space into a light-emitting space and a sealing space, and the light-emitting space faces the light-transmitting member; a side of the circuit board, on which the light-emitting space is located, is arranged with a light-emitting unit; a side of the circuit board, on which the sealing space is located, is electrically connected to a wire; a snap structure is arranged in the sealing space, and the crimp plate is detachably fixed in the sealing space by the snap structure; the crimp plate and the circuit board clamp a portion of the wire;

wherein a middle portion of the crimp plate defines an adhesive filling port passing through both sides of the middle portion.

13. The outdoor light according to claim 12, wherein a side of the crimp plate is arranged with two wire bundle blocks near an edge of the crimp plate, and the wire bundle blocks are spaced apart along the edge of the crimp plate; the wire is threaded out from between the two wire bundle blocks; each of the wire bundle blocks is configured to restrict a clamped end of the wire to avoid swinging.

14. The outdoor light according to claim 12, wherein the light-transmitting member is a convex lens; the convex lens is convex on an outward side, and the convex lens is concave on an inward side; the inward side of the convex lens and the circuit board enclose to define the light-emitting space.

* * * * *